United States Patent [19]

Ohkawa et al.

[11] 4,254,318

[45] Mar. 3, 1981

[54] DOOR SEAL ARRANGEMENT FOR HIGH-FREQUENCY HEATING APPARATUS

[75] Inventors: Shuji Ohkawa, Yokohama; Itsuo Kikuchi, Ibaraki, both of Japan

[73] Assignee: Hitachi Heating Appliances Co., Ltd., Japan

[21] Appl. No.: 969,095

[22] Filed: Dec. 13, 1978

[30] Foreign Application Priority Data

Dec. 13, 1977 [JP] Japan .................................. 52-150321
Dec. 13, 1977 [JP] Japan .................................. 52-150322
Jan. 9, 1978 [JP] Japan ...................................... 53-966

[51] Int. Cl.$^3$ ............................................ H05B 6/76
[52] U.S. Cl. ........................ 219/10.55 D; 174/35 GC; 219/10.55 F
[58] Field of Search ................. 219/10.55 D, 10.55 F, 219/10.55 R; 174/35 R, 35 GC, 35 MS; 333/239, 248, 208

[56] References Cited

U.S. PATENT DOCUMENTS

| | | | |
|---|---|---|---|
| 2,500,676 | 3/1950 | Hall et al. ...................... | 219/10.55 D |
| 3,182,164 | 5/1965 | Ironfield ......................... | 219/10.55 D |
| 3,448,232 | 6/1969 | Kluck ............................. | 219/10.55 D |
| 3,511,959 | 5/1970 | White .............................. | 219/10.55 D |
| 3,662,139 | 5/1972 | Love ............................... | 219/10.55 D |
| 3,767,884 | 10/1973 | Osepchuk et al. ............. | 219/10.55 D |
| 3,835,283 | 9/1974 | Suzuki ............................ | 219/10.55 D |
| 3,885,118 | 5/1975 | Valterson ...................... | 219/10.55 D |
| 4,053,731 | 10/1977 | Foerstner ...................... | 219/10.55 D |
| 4,137,441 | 1/1979 | Bucksbaum ................... | 219/10.55 D |

OTHER PUBLICATIONS

Van Koughnett, Dunn, J. G. *Doubly Corrugated Chokes For Microwave Systems,* Journal of Microwave Power 8(1) 1973, pp. 101-109.

*Primary Examiner*—Arthur T. Grimley
*Attorney, Agent, or Firm*—Craig & Antonelli

[57] ABSTRACT

A door seal arrangement for application to a high-frequency heating apparatus comprising a heating chamber having an access opening and an oven door for openably closing the access opening, for preventing leakage of electromagnetic wave energy through the peripheral area of the oven door. In this door seal arrangement, a plurality of reactance elements of a conductive metal material or a dielectric material having a high dielectric constant are disposed between the flat surfaces of the parallel plate transmission line constituted by the oven door and the heating chamber to extend along the access opening of the heating chamber thereby forming a series resonance circuit connected in parallel with the parallel plate transmission line provided by the oven door and the heating chamber. This series resonance circuit provides a high-frequency electromagnetical short-circuit plane at the disposed location of the reactance elements so that the electromagnetic wave energy emerging from within the heating chamber to be incident at an arbitrary incident angle upon the parallel plate transmission line and tending to leak toward the exterior of the high-frequency heating apparatus can be reflected back toward the heating chamber.

33 Claims, 26 Drawing Figures

FIG. IIA
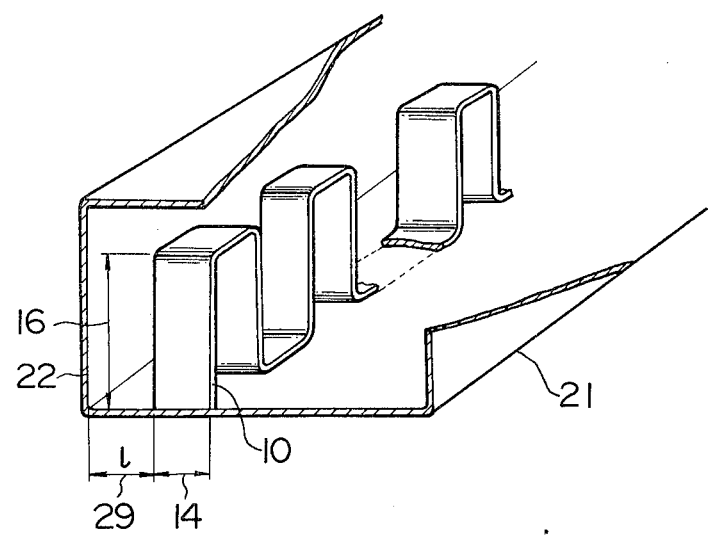
FIG. IIB
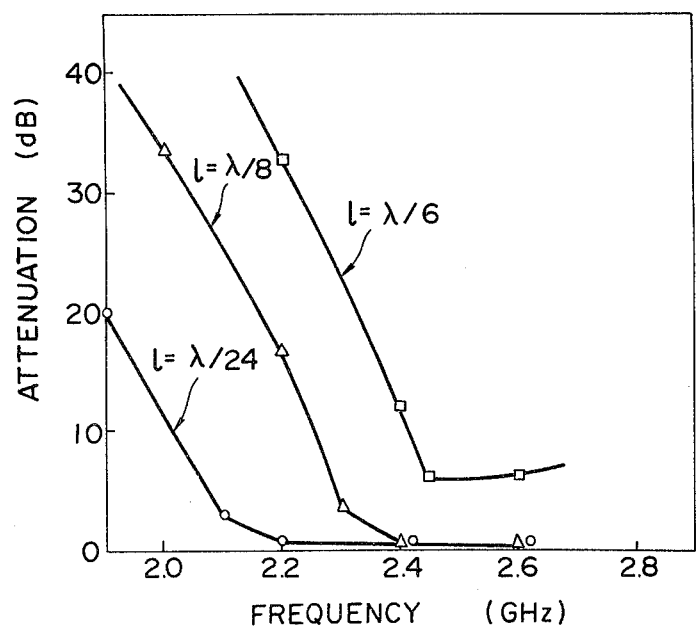

DOOR SEAL ARRANGEMENT FOR HIGH-FREQUENCY HEATING APPARATUS

This invention relates to a door sealing arrangement for a high-frequency heating apparatus for preventing leakage of electromagnetic wave energy through the peripheral area of the door of the high-frequency heating apparatus.

A freely openable oven door is indispensably required for a high-frequency heating apparatus so that an object to be heated can be freely loaded into and unloaded from the heating chamber of the high-frequency heating apparatus by opening the oven door. In the zone between the oven door and the body of the high-frequency heating apparatus, a gap tends to be formed between two electrical conductors. This gap acts as a parallel plate transmission line tending to permit leakage of the high-frequency wave energy from within the heating chamber toward the exterior of the heating apparatus, that is, toward the free space. Therefore, a door seal arrangement is indispensably required for such a high-frequency heating apparatus so as to safely ensure against possible leakage of the high-frequency wave energy from the heating chamber. The terminology "parallel plate transmission line" is hereinafter used in a broadened sense in this application. Namely, the "parallel plate transmission line" is not always restricted to such a transmission line that is composed of plates disposed in parallel to each other in the strict sense of geometry, but it may include a somewhat modified transmission line composed of plates which are disposed in a somewhat deviated manner from the true parallel state for production or design reasons.

As one of the prior art proposals, U.S. Pat. No. 2,500,676, for example, proposes a method according to which leakage of the high-frequency wave energy is prevented by providing a metal-to-metal contact between the oven door and the body of the high-frequency heating apparatus. However, the proposed method includes various problems such that strict surface flatness is required for both the oven door and the body of the high-frequency heating apparatus, that an assembling error occurs unavoidably during assembling the oven door on the body of the high-frequency heating apparatus resulting frequently in the difficulty of attaining the desired complete metal-to-metal contact, and that the metal-to-metal contact is difficult to be maintained over a long period of time of use of the high-frequency heating apparatus. As another prior art proposal, a so-called choke system utilizing a quarter wave-length line is disclosed in U.S. Pat. No. 3,182,164. In most high-frequency heating apparatuses, especially, microwave ovens presently in use, a door seal arrangement is widely employed which comprises the combination of the metal-to-metal contact and the choke system above described. Further, it is a common practice to additionally provide a high-frequency wave absorbing material such as carbon rubber in order to absorb and attenuate the leaking high-frequency wave energy, since the leakage of such high-frequency wave energy cannot be completely prevented by the combination of the metal-to-metal contact and the choke system. Namely, the choke system itself has various defects as pointed out later in regard to the complete prevention of undesirable electromagnetic wave leakage.

It is therefore a primary object of the present invention to obviate the defects of the prior art door seal arrangement based on the choke system and to provide a novel and improved door seal arrangement for a high-frequency heating apparatus, in which the wave absorbing material is removed to reduce the overall cost of the apparatus, and yet, which is capable of reducing the rate of high-frequency wave energy leakage by more than 10 dB compared with the prior art door seal arrangement, thereby ensuring a higher degree of safety than heretofore.

In order to realize a door seal arrangement which eliminates the use of the wave absorbing material, some suitable means must be provided to produce a high-frequency electromagnetic short-circuit plane between the oven door and the body of the high-frequency heating apparatus. The aforementioned choke system has also been one of the means for providing such a high-frequency electromagnetic short-circuit plane.

According to the present invention which obviates the defects of the prior art choke system, the door seal arrangement has a structure and a function conspicuously different from those of the prior art choke system.

In accordance with the present invention, there is provided, in a high-frequency heating apparatus comprising a heating chamber having a loading and unloading access opening and a door openably closing the access opening, a door seal arrangement for preventing leakage of electromagnetic wave energy through the peripheral area of the door of the high-frequency heating apparatus, wherein a plurality of reactance elements of a conductive metal material or a dielectric material having a high dielectric constant are disposed in the parallel plate transmission line constituted by the door and the heating chamber to extend along the periphery of the access opening of the heating chamber. These reactance elements form a series resonance circuit connected in parallel with the parallel plate transmission line provided by the door and the heating chamber, so that the series resonance circuit provides a high-frequency electromagnetic short-circuit plane at the disposed location of the reactance elements, whereby the electromagnetic wave energy, emerging from within the heating chamber to be incident at an arbitrary incident angle upon the parallel plate transmission line and tending to leak toward the exterior of the high-frequency heating apparatus through the peripheral area of the door, can be reflected back toward the heating chamber.

The present invention will now be described in detail with reference to the accompanying drawings, in which:

FIGS. 6A and 6B illustrate in combination the electromagnetic wave attenuating action of the wavy metal sheet, in which FIG. 6A is a schematic perspective view of a conductor post in the form of a prism erected in a rectangular waveguide, and FIG. 6B is a graph showing the frequency characteristic of the structure shown in FIG. 6A;

Figure 4:
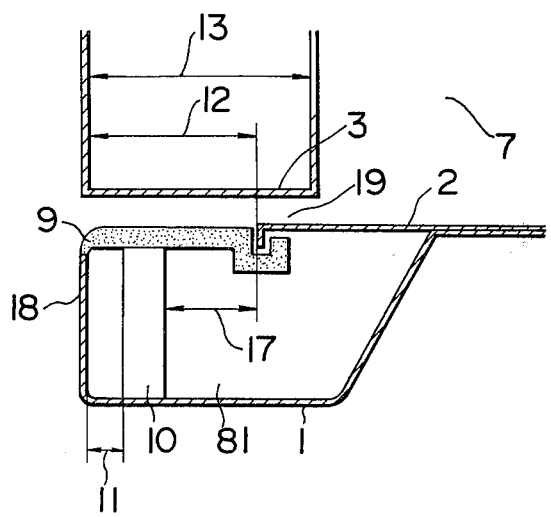
FIG. 4 is a schematic cross-sectional view of an embodiment of the door seal arrangement according to the present invention.
Figure 7A:
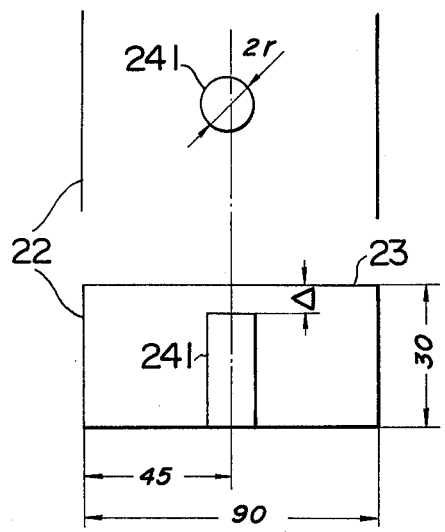
Figure 7B:
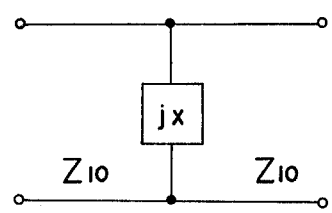
Figure 7C:
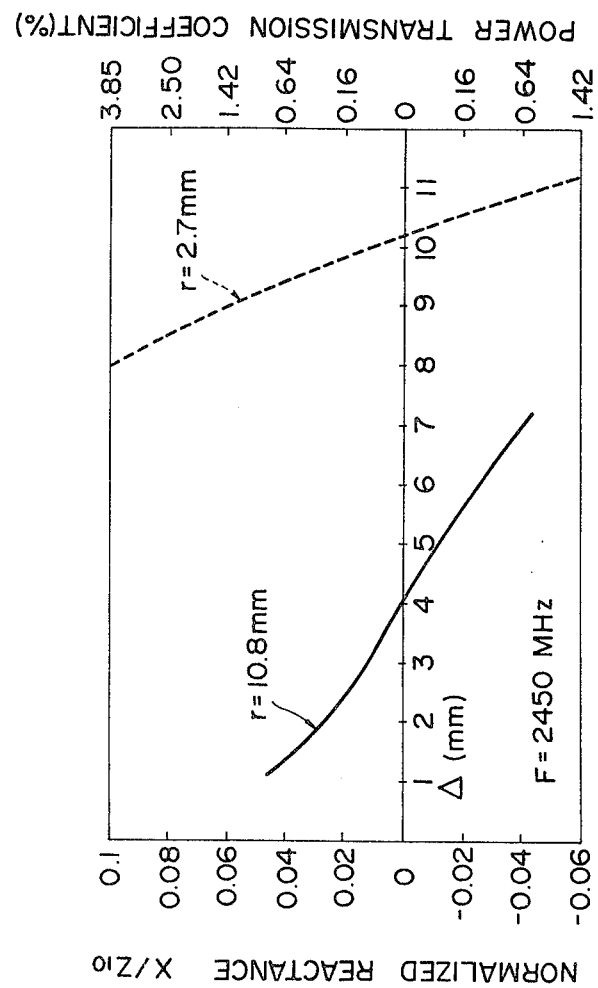
Figure 8A:
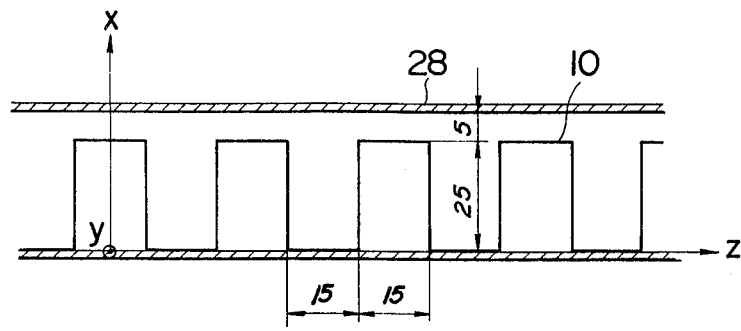
Figure 8B:
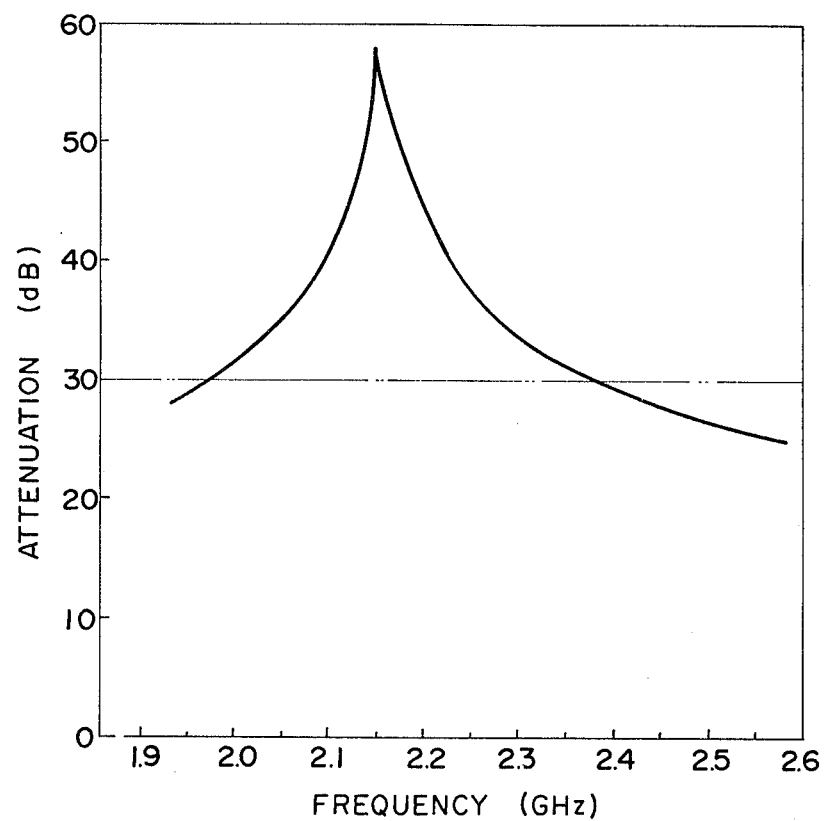
Figure 8C:
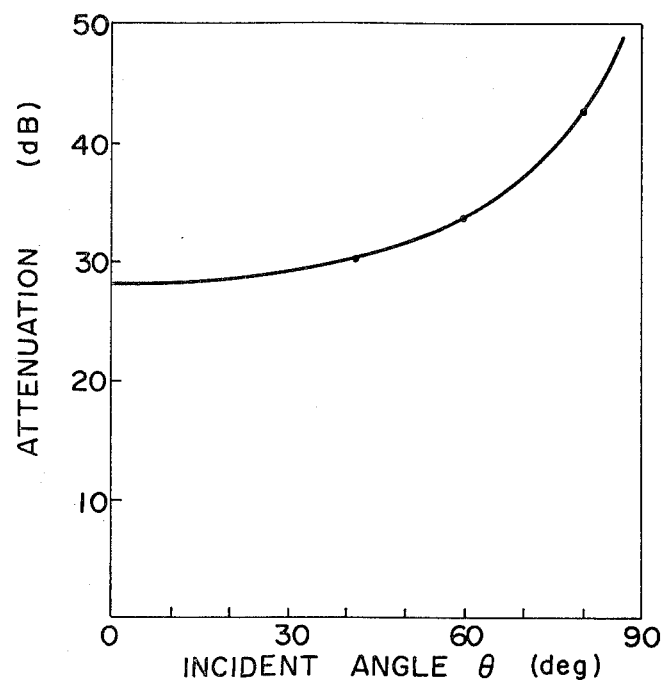
Figure 9:
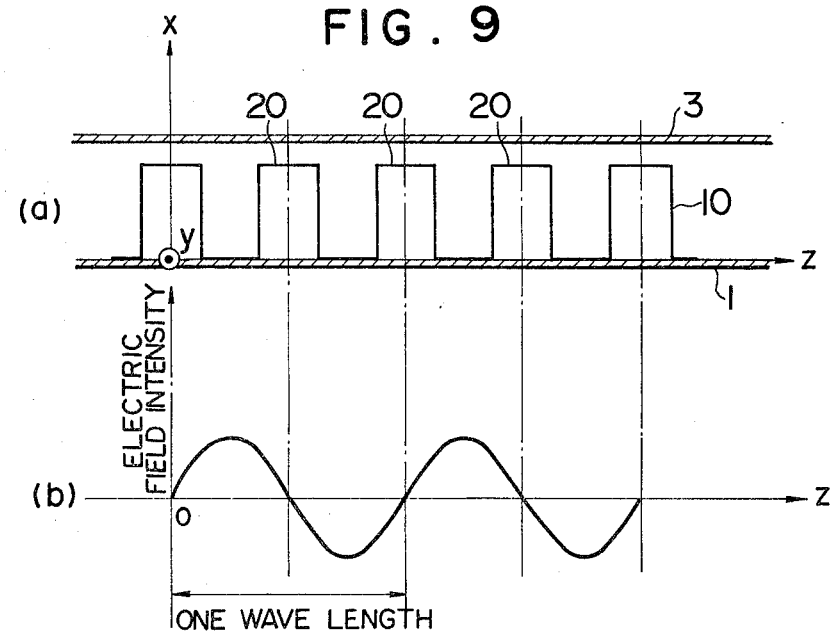
Figure 10:
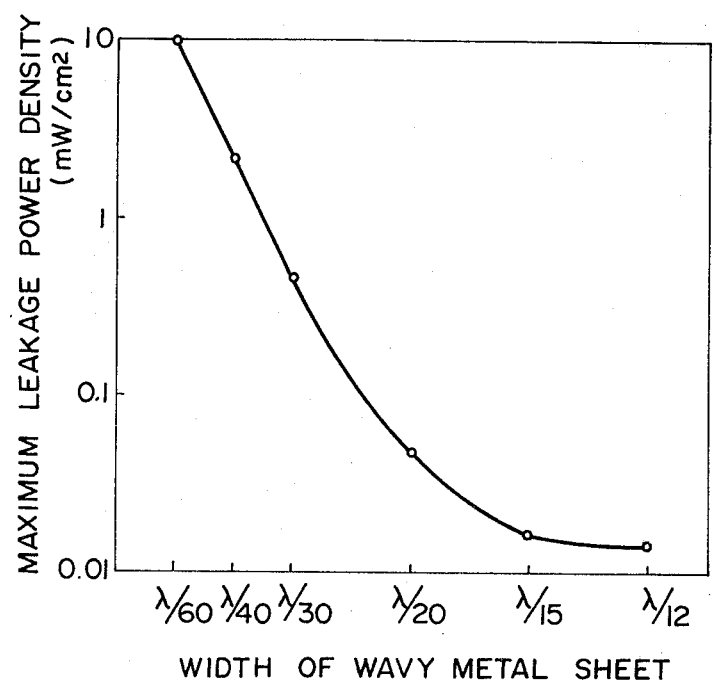
Figure 12:
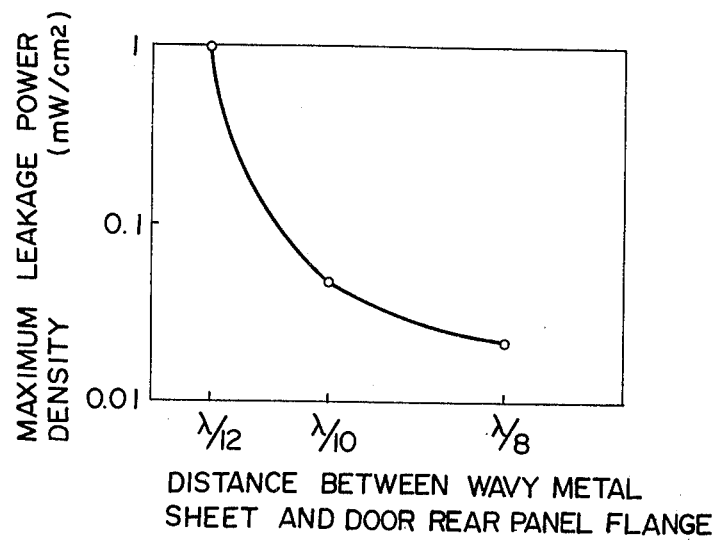
Figure 18:
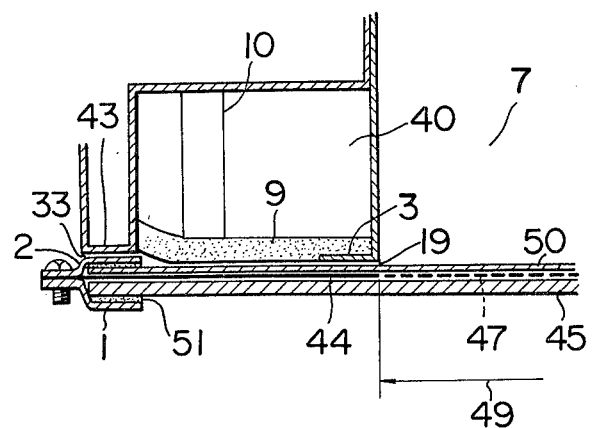
Figure 19:
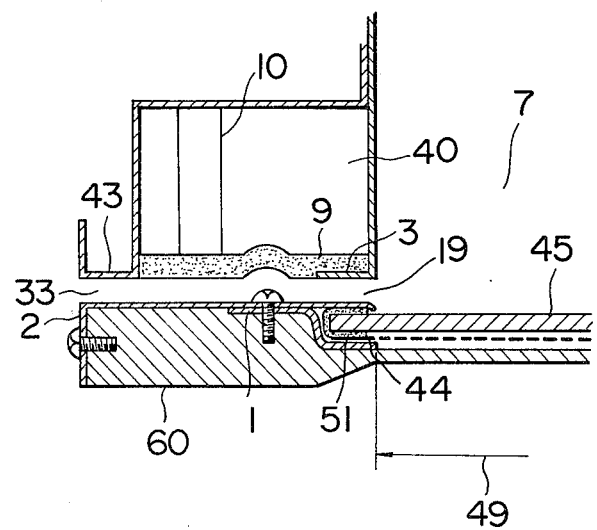
Figure 20:
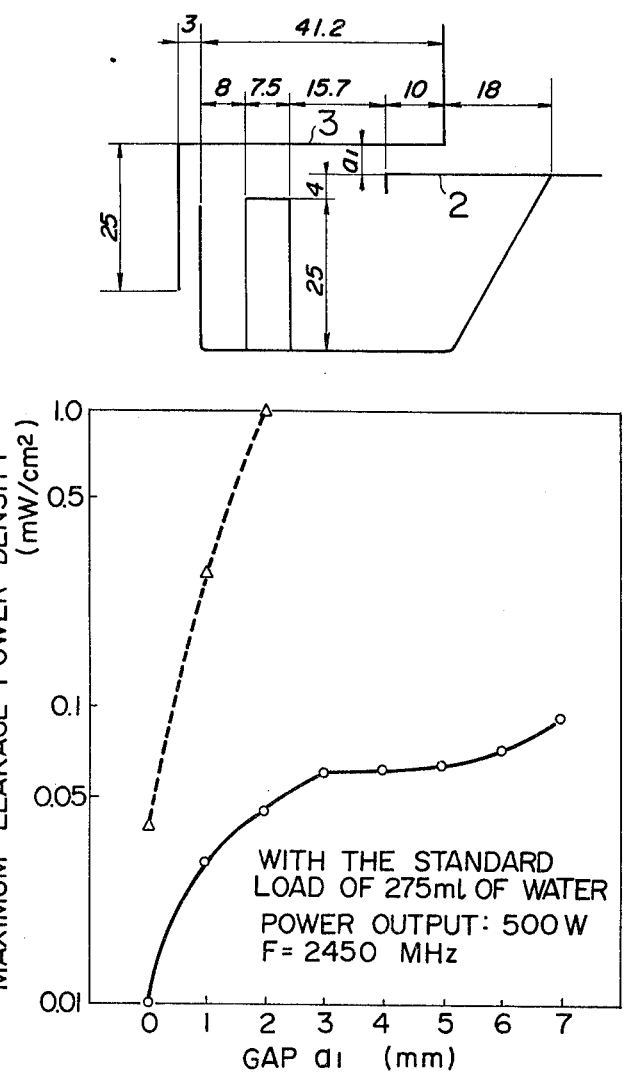

FIGS. 7A, 7B and 7C illustrate in combination the electromagnetic wave attenuating action of the wavy metal sheet, in which FIG. 7A is a schematic view in plane and elevation of a conductor post in the form of a solid circular cylinder erected in a rectangular waveguide, FIG. 7B is an equivalent circuit diagram of the structure shown in FIG. 7A, and FIG. 7C is a graph showing the equivalent circuit constant and the power transmission coefficient of the structure shown in FIG. 7A;

FIGS. 8A, 8B and 8C illustrate in combination the electromagnetic wave attenuating action of the wavy metal sheet, in which FIG. 8A is a schematic sectional view of the wavy metal sheet disposed in a parallel plate transmission line, FIG. 8B is a graph showing the frequency characteristic of the structure shown in FIG. 8A, and FIG. 8C is a graph showing the rate of attenuation relative to the incident angle in the structure shown in FIG. 8A;

FIG. 9 illustrates the electromagnetic wave attenuating action of the wavy metal sheet, in which (a) is a schematic sectional view of the wavy metal sheet disposed between the oven flange and the door front panel, and (b) is a graph showing the relation between the period of undulation of the wavy metal sheet and the period of the electromagnetic wave;

FIG. 10 is a graph showing the relation between the width of the wavy metal sheet and the maximum leakage power density in the structure shown in FIG. 4;

FIGS. 11A and 11B illustrate in combination the relation between the wavy metal sheet and the side wall of a rectangular waveguide with respect to the slow wave effect by the wavy metal sheet, in which FIG. 11A is a schematic perspective view of the wavy metal sheet disposed in the rectangular waveguide, and FIG. 11B is a graph showing the frequency characteristic of the structure shown in FIG. 11A;

FIG. 12 is a graph showing the maximum leakage power density relative to the distance between the wavy metal sheet and the door rear panel flange;

FIGS. 13, 14, 15, 16, 17, 18 and 19 are schematic cross-sectional views of other embodiments of the present invention respectively; and FIG. 20 shows, by way of example, the preferred dimensions of the door seal arrangement according to the present invention and also shows the electromagnetic wave leakage preventive performance of the improved door seal arrangement according to the present invention.

For a better understanding of the present invention, it will be necessary to describe the structure and function of the prior art choke system in detail before describing preferred embodiments of the present invention in detail.

Figure 1:
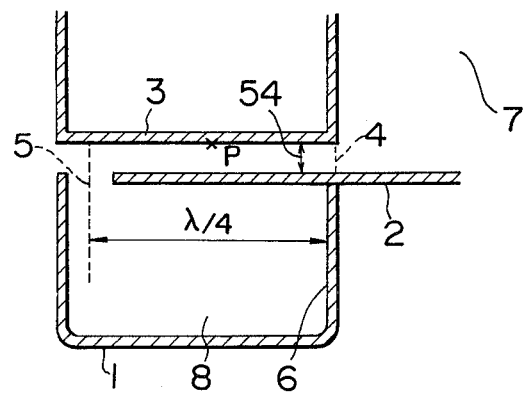
FIG. 1 is a schematic cross-sectional view of part of a choke system which represents one form of a prior art door seal arrangement.

FIG. 1 shows the basic structure of the choke system employed in a prior art seal arrangement for a high-frequency heating apparatus. Referring to FIG. 1, a front panel 1 of an oven door defines a choke channel 8 provided at the periphery of the oven door. A rear panel 2 of the oven door extends in parallel with an oven flange 3 from the side of a high-frequency heating chamber 7 to close the choke channel 8 except an opening having its center on a plane 5 (hereinafter referred to as opening plane). In the structure shown in FIG. 1, the width of the choke channel 8 in the oven door, that is, the distance between the side wall surface 6 of the choke channel 8 and the opening plane 5 is selected to be approximately equal to $\lambda/4$, where $\lambda$ is the wavelength of an electromagnetic wave used for high-frequency heating. Thus, the structure shown in FIG. 1 is equivalent to an arrangement in which the interface 4 is closed by conductor walls.

However, this prior art choke system includes three inherent problems. A first problem resides in the fact that the choke system comprises generally the metal-to-metal contact between the oven flange 3 and the door rear panel 2. Assuming now the oven flange 3 and the door rear panel 2 are in contact with each other only at a point P in FIG. 1 and are not in contact at other points, the choke effect against the electromagnetic wave passing in the vicinity of this point P is reduced. This is because the choke system is featured by providing the short-circuit plane (the side wall surface 6) of conductor at the location spaced apart by $\lambda/2$ from the plane (the interface 4) which should act as the electromagnetic short-circuit plane as described in U.S. Pat. No. 3,182,164. Thus, when the oven flange 3 and the door rear panel 2 are only in point contact with each other at the point P to provide a short-circuit point in this position, the interface or plane 4 does not act as the short-circuit plane any more. That is, the choke effect is governed by the surface flatness of the oven flange 3 and the rear panel 2 of the oven door.

The second problem resides in the fact that the choke effect is sharply reduced with the increase in the gap 54 between the oven flange 3 and the rear panel 2 of the oven door. In the prior art choke system having the structure shown in FIG. 1, the leakage power density increases at a rate of about 8 dB per mm of the increase in the gap 54 between the oven flange 3 and the rear panel 2. Such a phenomenon arises for the reasons described presently. An electrical insulator film having a thickness of about 50 $\mu$m is generally applied to the rear panel 2 of the oven door or to the oven flange 3 in order to prevent generation of a spark between the rear panel 2 and the oven flange 3. In designing the choke system, the dimensions including the depth of the choke channel 8 are selected to minimize the leakage power density in the state in which the parallel plate transmission line of length $\lambda/4$ constituted by the rear panel 2 and front panel 1 of the oven door is connected to the parallel plate transmission line of length $\lambda/4$ constituted by the oven flange 3 and the door rear panel 2 which are spaced apart from each other by the gap of 50 $\mu$m which is the thickness of the insulator film. Thus, although these two $\lambda/4$ lines have different characteristic impedances, the dimensions of the choke system are selected so that the choke system can exhibit its maximum choke effect in the above state. Therefore, a variation of the gap between the oven flange 3 and the rear panel 2 of the oven door results in a corresponding variation of the characteristic impedance of the associated transmission line thereby reducing the choke effect. As is well known in the field of the microwave engineering, the characteristic impedance of a parallel plate transmission line is inversely proportional to the value of the gap between the two parallel flat plates. Thus, when, for example, the gap 54 increases up to 1 mm from 50 $\mu$m, the characteristic impedance is reduced to 1/20 of the value corresponding to the gap 54 of 50 $\mu$m. In the choke system, therefore, severe accuracy is required during assembling the oven door on the body of the high-frequency heating apparatus, and yet, there is no guarantee against the possible increase in the leakage power due to slackening of the door hinges resulting from a long period of time of use.

Figure 2:
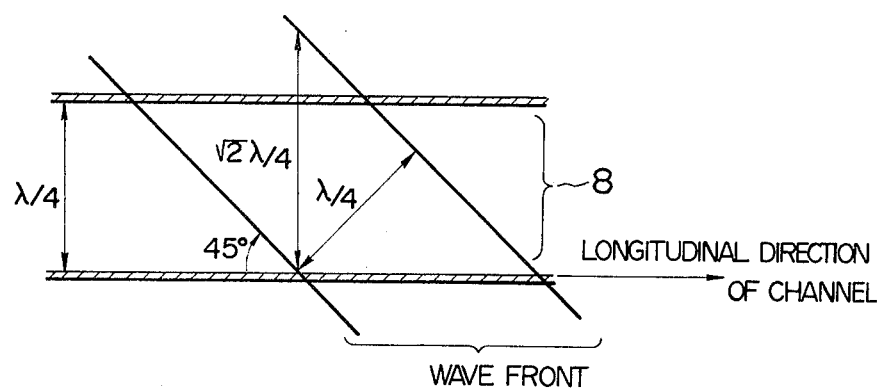
FIG. 2 illustrates a plane wave entering the choke channel or groove of the prior art choke system at an angle with respect to the longitudinal direction of the channel or groove.

The third problem resides in the fact that the basic principle of the choke system holds only when the electromagnetic wave enters the choke channel 8 in a direction orthogonal with respect to the longitudinal direction of the choke channel 8. The choke effect is greatly reduced when the electromagnetic wave enters the choke channel 8 in other directions, that is, when, for example, the electromagnetic wave enters the choke channel 8 at an angle of 45° with respect to the longitudinal direction of the choke channel 8 as shown in FIG. 2, since the wavelength in the widthwise direction of the choke channel 8 is $\sqrt{2}\lambda$ in such a case. The electromagnetic wave incident upon the choke channel 8 in such an angular relation can be expressed as the sum of the wave component orthogonal with respect to the longitudinal direction of the choke channel 8 and the wave component parallel with respect to the longitudinal direction of the choke channel 8. The choke system will not satisfactorily exhibit its choke effect against the latter component although it can exhibit its choke effect against the former component. In the case of the high-frequency heating apparatus such as the microwave oven, the direction of the incident electromagnetic wave energy is the function of location of the access opening, and it is also the function of the time when means such as a turntable or a stirrer is used to minimize the possibility of non-uniform heating. Therefore, it is an important problem that leakage of the electromagnetic wave energy entering the choke channel 8 in an oblique direction, as shown for example in FIG. 2, cannot be prevented in the high-frequency heating apparatus such as the microwave oven.

As described already, the conventional door seal arrangement comprising the combination of the choke system, the metal-to-metal contact and the wave absorbing material is employed in most of microwave ovens presently in use. Another door seal arrangement has been proposed in an effort to obviate the aforementioned third problem by combining a so-called periodic structure with the known choke system. For example, in the door seal arrangement disclosed in U.S. Pat. No. 3,767,884, slots are periodically cut along the entire periphery of the rear panel 2 of the oven door in a right-angular relation with respect to the longitudinal direction of the choke channel 8 in FIG. 1 to form a wave attenuation line extending in the longitudinal direction of the choke channel 8 so as to inhibit propagation of the electromagnetic wave component incident upon the choke channel 8 in the direction parallel with respect to the longitudinal direction of the choke channel 8 and to permit entrance, into the choke system, of only the wave energy incident upon the choke channel 8 in the direction orthogonal with respect to the longitudinal direction of the choke channel 8, thereby maintaining the desired choke effect and preventing the undesirable leakage of the electromagnetic wave energy. An entirely similar proposal is also made in Japanese Patent Publication No. 40055/1977 and British Pat. No. 1,022,103. A method utilizing such a periodic structure for preventing leakage of the parallel incident electromagnetic wave energy and ensuring the desired choke effect is also disclosed in U.S. Pat. No. 2,772,402.

In the methods disclosed in U.S. Pat. No. 3,767,884 and Japanese Patent Publication No. 40055/77 cited above, a periodic structure is disposed in the choke channel 8 to inhibit propagation of the electromagnetic wave energy along the longitudinal direction of the choke channel 8 thereby further enhancing the choke effect of the choke system. Thus, an equivalent short-circuit plane is similarly formed at the interface 4 in FIG. 1 in these patents too, and therefore, the first and second problems pointed out hereinbefore with reference to the prior art choke system remain still unsolved. More definitely, such a periodic structure is employed merely as an auxiliary means for the choke system, and the periodic structure does not act essentially as a means for positively preventing leakage of the electromagnetic wave.

In an effort to solve the aforementioned problems involved in the prior art choke system, the inventors contemplate to provide, in a high-frequency heating apparatus comprising a heating chamber having an access opening and a door for opening an closing the access opening, a door seal arrangement for preventing leakage of electromagnetic wave energy from the peripheral area of the door of the high-frequency heating apparatus, wherein a plurality of reactance elements of a conductive metal material, or a dielectric material having a high dielectric constant, are disposed between the flat surfaces of the parallel plate transmission line constituted by the door and the heating chamber to extend along the periphery of the access opening of the heating chamber. These reactance elements form a series resonance circuit connected in parallel with the parallel plate transmission line provided by the door and the heating chamber, and this series resonance circuit provides a high-frequency electromagnetic short-circuit plane at the disposed location of the reactance elements, whereby the electromagnetic wave energy emerging from within the heating chamber to be incident at an arbitrary incident angle upon the parallel plate transmission line and tending to leak toward the exterior of the high-frequency heating apparatus through the peripheral area of the door can be reflected back toward the heating chamber.

The structure and function of such a novel and improved door seal arrangement will be described in more detail.

When a post of a conductor having a diameter of about $\lambda/8$ (where $\lambda$ is the wavelength of the electromagnetic wave used for high-frequency heating) is placed in a conventional rectangular waveguide in such a relation that the conductor post is fixed at one end thereof to one of the waveguide walls in the direction of H-plane with its sides disposed in parallel with the E-plane and is spaced apart at the other end thereof from the other waveguide wall in the direction of H-plane by about $\lambda/40$, the plane extending through the centerline of the post in a direction orthogonal with respect to the axis of the waveguide provides a high-frequency electromagnetic short-circuit plane when viewed from the input end of the waveguide. That is, this plane is equivalent to a conductor plate which replaces the plane, and the incident wave energy is completely reflected at this plane.

The reasons for attaining such a wave cut-off characteristic will be described. The energy of the electric field produced in the space between the conductor post and the walls of the waveguide and the energy of the magnetic field produced around the conductor post by the electric current flowing along the surface of the conductor post correspond to a capacitance and an inductance respectively in the sense of an electrical circuit, and they act as a series resonance circuit disposed or connected in parallel with the waveguide line thereby forming a high-frequency electromagnetic short-circuit plane at the position of the conductor post. It will be easily appreciated that, in the case where the width of the waveguide (the width of the H-plane) is sufficiently widened, extending this way of thinking, a plurality of the aforementioned conductor posts may be periodically arranged on the plane orthogonal with respect to the axis of the waveguide so that a high-frequency electromagnetic short-circuit plane can be similarly provided at the position of the palne orghogonal with respect to the axis of the waveguide. Further, the periodic arrangement of the plural conductor posts is effective in that the wave attenuating effect of the high-frequency electromagnetic short-circuit plane would not be reduced even when the electromagnetic wave is incident in an oblique relation, and rather, this effect is enhanced with an increase in the incident angle. Each of these conductor posts may be hollowed in the axial direction of the wave-guide to be formed with a cavity extending in the axial direction of the waveguide. These cavities may have a depth of about λ/15 even when the width thereof may be about λ/8. This arrangement provides reactive attenuation of about 15 dB against the electromagnetic wave passing through the cavities and is thus equivalent, in view of high-frequency electromagnetic wave transmission, to the arrangement of the cavity-less conductor posts. Thus, a plurality of hollow tubular elements of a conductive metal material may be arranged in lieu of these conductor posts. Further, this arrangement of the plural hollow tubular metal elements may be replaced by a metal sheet bent into a wavy form, since the latter is as effective in the electromagnetic wave attenuation effect as the former. From the viewpoint of manufacture, it is simpler or easier to dispose such a wavy metal sheet than to arrange the plural conductor posts on the plane orthogonal with respect to the axis of the waveguide.

Thus, when a metal sheet bent into a wavy form as above described is disposed between the flat surfaces of the parallel plate transmission line constituted by the oven door and the heating chamber to extend along the access opening of the heating chamber thereby providing a high-frequency electromagnetic short-circuit plane at the location of this metal sheet according to the idea above described, the electromagnetic wave incident at an arbitrary incident angle upon the metal sheet bent into the wavy form can be completely reflected back toward the heating chamber. The disposition of the wavy metal sheet acting to provide a high-frequency electromagnetic short-circuit plane at the location thereof has eliminated the problem encountered with the prior art choke system, that is, the problem of the incomplete metal-to-metal contact between the oven flange and the door rear panel flange. The high-frequency electromagnetic short-circuit plane formed at the location of the wavy metal sheet could be maintained regardless of an increase in the gap between the oven door and the body of the high-frequency heating apparatus when the wavy metal sheet was designed to have a relatively large width. It has therefore been possible to solve such another prior art problem that the leakage power increases sharply with the increase in the gap between the oven door and the body of the high-frequency heating apparatus.

According to the present invention, a metal sheet bent into a wavy form, that is, a periodic structure of a conductive metal material as above described is disposed between the flat surfaces of the parallel plate transmission line constituted by the oven door and the heating chamber of the high-frequency heating apparatus to extend along the periphery of the access opening of the heating chamber, so that a slow-wave transmission line in which the phase velocity of the propagating electromagnetic wave energy is lower than the velocity of light can be provided along the periphery of the access opening of the heating chamber, and this line forms a closed loop which acts as a band-pass filter. As is well known in the field of the microwave engineering, the phase constant in the propagation direction of a slow-wave transmission line is a real number, while the phase constant in a direction orthogonal with respect to the propagation direction is a pure imaginary number. Therefore, even if the wave energy tending to propagate in the direction of the line were produced by excitation, this wave energy would be captured by the slow-wave transmission line to be caused to propagate along this line, and there is no chance for the wave energy to propagate in the direction orthogonal with respect to the direction of the line in the course of propagation. This action is also considered to enhance the effect of preventing electromagnetic wave leakage according to the present invention.

Preferred embodiments of the present invention will now be described in detail with reference to the drawings.

Figure 3:
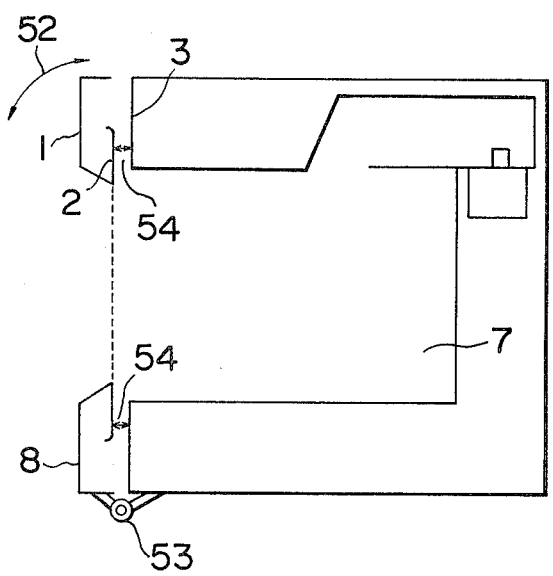
FIG. 3 is a schematic vertical sectional view of a conventional high-frequency heating apparatus to which the present invention is applied.

FIG. 3 shows an oven door disposed opposite to an oven flange 3 of a high-frequency heating apparatus. The oven door includes a choke channel 8 having an opening opposite to the oven flange 3.

Figure 5:
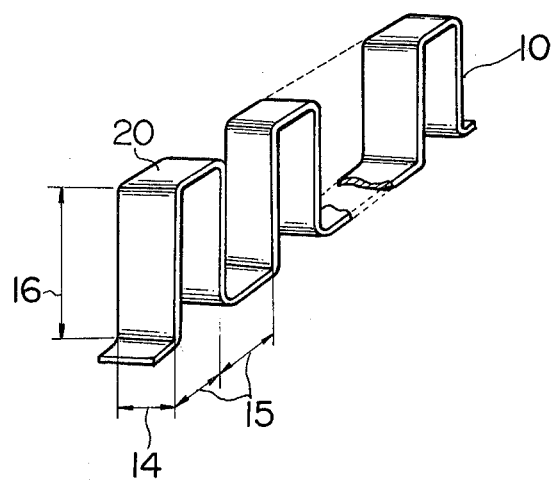
FIG. 5 is a schematic perspective view of one form of a wavy metal sheet preferably employed in the present invention.

FIG. 4 shows principal parts of the oven door in the vicinity of the oven flange 3 in an embodiment of the door seal arrangement according to the present invention. Referring to FIG. 4, a channel 81 is defined by a front panel 1 of the oven door, and an opening of the channel 81 is defined between the periphery of the rear panel 2 of the oven door and an end portion of an outer peripheral wall 18 of the channel 81. The channel 81 of this invention does not show such a choke effect of the prior art choke channel 8. The width 13 of the confronting wall portion of a heating chamber 7 is selected to be larger than the width 12 of the opening of the channel 81, so that a wave passage 19, in the form of a parallel plate transmission line, is defined between the oven flange 3 and the rear panel 2 of the oven door. A wavy metal sheet 10 having a shape as shown in FIG. 5 is disposed within the channel 81 in the oven door. The opening of the channel 81 is covered with a cover member 9 of a plastic material which prevents intrusion of foul material and protects the internal structure of the channel 81.

Figure 6A:
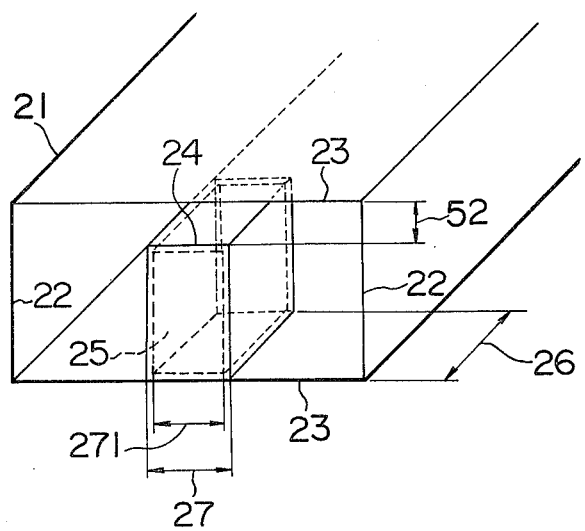
Figure 6B:
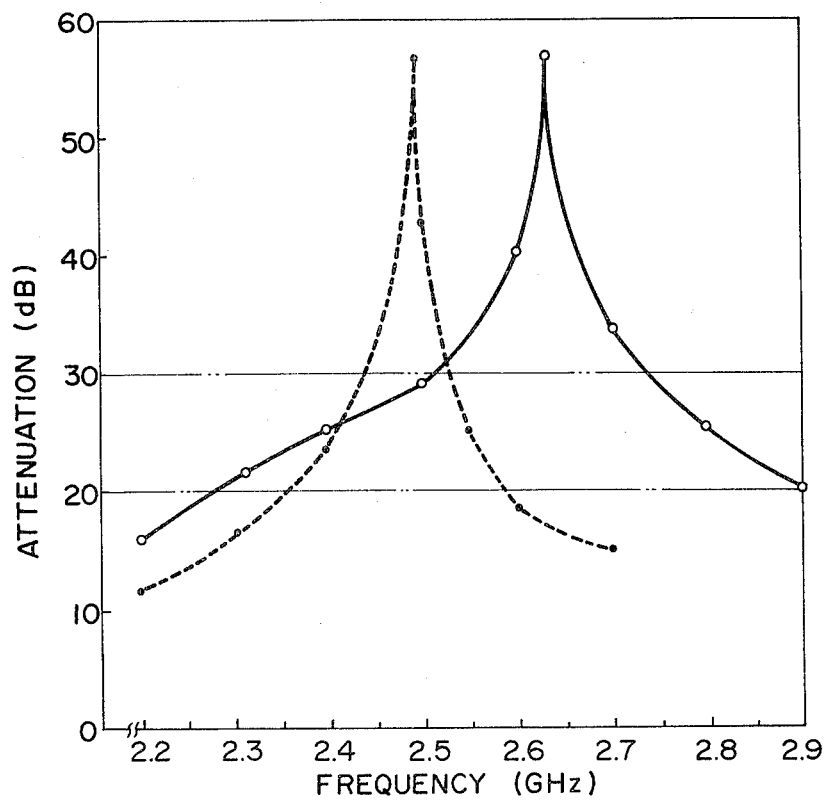

The functions of the individual parts will now be described. At first, the function of the wavy metal sheet 10 forming an essential part of the present invention will be described. It is well known in the field of the microwave enginering that, when a post 24, in the form of a solid quadrangular prism of an electrical conductor, is erected in a rectangular waveguide 21 in a relation orthogonal and parallel with respect to the H-plane and the E-plane respectively of the waveguide 21 as shown in FIG. 6A, this structure provides a frequency characteristic as, for example, shown in FIG. 6B. It will be seen from the solid curve shown in FIG. 6B that the electromagnetic wave energy can be attentuated by more than 20 dB over a wide frequency range. The solid curve in FIG. 6B represents the experimental data at a microwave frequency of 2,450 MHz when the width 27 and depth 26 of the prism 24 are selected to be λ/8 and λ/16 respectively, the gap 52 between the upper face of the prism 24 and the upper one of the walls 23 in H-plane of the waveguide 21 is selected to be λ/40 with the lower face of the prism 24 being mounted on the lower one of the walls 23, the width of each of the walls 23 in H-plane of the waveguide 21 is selected to be 90 mm, and the width of each of the side walls 22 in E-plane of the waveguide 21 is selected to be 30 mm. Such a wave cut-off characteristic can be obtained for the reasons described presently. The energy of the electric field stored in the gap 52 between the conductor post 24 and the upper one of the walls 23 in H-plane of the waveguide 21 and the energy of the magnetic field stored around the conductor post 24 by the electric current flowing along the surface of the conductor post 24 correspond to a capacitance and an inductance respectively in the sense of an electrical circuit, and they form a series resonance circuit which exhibits a wave cut-off characteristic around a specific center frequency. It is needless to say that this resonance frequency can be shifted by varying the size of the conductor post 24 or by varying the dimension of the gap 52 between the upper face of the conductor post 24 and the associated upper wall 23 in H-plane of the waveguide 21. For example, the resonance frequency is shifted toward a higher frequency when the size of the conductor post 24 or the dimension of the gap 52 is increased.

The propagation characteristic or frequency characteristic represented by the solid curve in FIG. 6B will not be substantially changed even when a rectangular cavity 25 is bored through the prism 24 to provide a hollow prism or a hollow tubular element of metal material. This is because the degree of wave coupling between the electromagnetic wave inlet and outlet of the cavity 25 is small or about −13 dB, and this arrangement is equivalent to an arrangement in which the inlet and outlet of the cavity 25 are closed by a conductive metal plate, since the width 271 and depth 26 of the cavity 25 of the hollow tubular metal element are about λ/8 and λ/16 respectively. The term "degree of wave coupling" is used herein to designate the amount of attenuation of the electromagnetic wave when the hollow tubular metal element is regarded to be a rectangular waveguide, and the electromagnetic wave of the TE$_{10}$ mode which is the dominant mode passes through the rectangular waveguide provided by the hollow tubular metal element. This amount of attenuation is given by $$20 \log_{10}\left[\exp\left(-d\sqrt{(\frac{\pi}{w})^2 - (\frac{\pi}{\lambda})^2}\right)\right]$$

where w and d are the width and depth respectively of the cavity of the hollow tubular metal element, and π is the ratio of the circumference of a cricle to its diameter.

However, when the cavity of the depth 26 of the hollow tubular element is decreased from λ/16 to λ/80, the aforementioned degree of wave coupling is increased up to about −3 dB, and the propagation characteristic or frequency characteristic is subjected to a great variation. Referring to FIG. 6B again, the broken curve represents the experimental data of the propagation or frequency characteristic when the hollow tubular metal element is formed by a wire having a diameter of 1.5 mm. An important fact to be noted in this connection is not the aforementioned shift of the resonance frequency, but that the rejection band width is narrowed with the result that the amount of attenuation itself is also decreased when the hollow tubular metal element which is composed of a thin wire of 1.5 mm diameter is regarded to be a band rejection filter. When the band width having the amount of attenuation over 30 dB is specifically noted in FIG. 6B, the rejection band width of about 220 MHz observed with the depth, λ/16, of the cavity of the hollow tubular metal element is narrowed to about 80 MHz which is about ⅓ of the above value of 220 MHz when the depth is changed from λ/16 to λ/80. This narrowed rejection band width poses two problems. The first problem is associated with the application of the hollow tubular metal element to the microwave oven. In such an application, the door seal arrangement must be so designed that the resonance frequency is set in the vicinity of 2,450 MHz, and the amount of attenuation at the resonance frequency of 2,450 MHz is more than, for example, 30 dB or 40 dB. Strict dimensional accuracy is therefore required when the rejection band width is narrow. This requirement for such dimensional accuracy will be described later. The second problem is associated with the operating characteristic of the magnetron employed in the microwave oven. The magnetron has a wide noise frequency range around the fundamental oscillation frequency of 2,450 MHz. These noise frequency components will leak through the gap between the body and the door of the microwave oven and will have a high leakage level when the rejection band width is narrow. For example, the amount of attenuation at a point spaced apart by 200 MHz from the center frequency of 2,450 MHz in FIG. 6B is about 26 dB when the cavity of the hollow tubular metal element has the depth 26 of λ/16, while it is about 16 dB when the hollow tubular metal element is formed from the wire 1.5 mm in diameter and has the depth 26 of λ/80. Therefore, the leakage level of the noise wave increases by about 10 dB in the case of the latter compared with the former.

Description will next be directed to the reasons why the increased depth of the hollow tubular metal element can obviate the sharp increase in the leakage power due to the increase in the gap between the oven door and the body of the high-frequency heating apparatus. FIG. 7A shows a post 241 in the form of a solid circular cylinder of an electrical conductor erected in a rectangular waveguide. The widths of each of the top and bottom walls 23 in H-plane and each of the side walls 22 in E-plane of this waveguide are 90 mm and 30 mm respectively. The conductor post 241 is erected at the center of bottom one of the walls 23 in H-plane of the waveguide and has a radius r. The upper face of the conductor post 241 is spaced apart by a gap Δ from the top one of the walls 23 in H-plane of the waveguide.

An equivalent circuit of such a conductor post 241 inserted in a rectangular waveguide as shown in FIG. 7A is illustrated in FIG. 7B in which it will be seen that a reactance jx is connected in parallel with a line of the characteristic impedances Z$_{10}$ of the TE$_{10}$-mode rectangular waveguide. It will be seen from FIG. 7C that this reactance jx is capacitive at a large value of the gap Δ and becomes gradually inductive with a decrease in the value of the gap Δ. At a suitable value of the gap Δ, the reactance jx is reduced to zero, and the two-port circuit shown in FIG. 7B is short-circuited to completely inhibit transmission of the wave energy. The normalized reactance value shown in FIG. 7C is cited from a paper entitled "Waveguide-to-Coaxial Line Transition with Load Mounted in the Gap" by Shuji Ohkawa and Michio Suzuki, Transactions B of the Institute of Electronics and Communication Engineers of Japan, Vol. 57-13, No. 3, pp. 70–78, March 1974, published by Scripta Publishing Company, in USA.

The relation shown in FIG. 7C will be briefly described. The left-hand side vertical axis of FIG. 7C represents the value of normalized reactance which is obtainable by normalizing the reactance X of the conductor post 241 by the characteristic impedance $Z_{10}$ of the rectangular waveguide in the $TE_{10}$ mode. The horizontal axis represents the value in mm of the gap Δ between the upper face of the conductor post 241 and the top wall 23 in H-plane of the waveguide. The right-hand side vertical axis in FIG. 7C represents the power transmission coefficient corresponding to the value of the normalized reactance $X/Z_{10}$. The term "power transmission coefficient" is defined herein as the ratio in percentage of the transmitting power portion to the total power input, when the power is supplied from one of the ports of the two-port circuit in the matching state in which the other port is terminated by the impedance $Z_{10}$. Substituting $X/Z_{10}$ by, or letting $X/Z_{10} = x$, the power transmission coefficient $T_p$ is defined as $$T_p = \frac{4x^2}{1 + 4x^2}.$$

Referring to FIG. 7C, there is shown the values of the normalized reactance $X/Z_{10}$ for two conductor posts having a radius r of 2.7 mm and a radius r of 10.8 mm respectively. It is apparent that the latter curve has an inclination less than that of the former curve. Suppose, for example, that the gap Δ increases by 1 mm from the value at the resonance point. Then, the power transmission coefficient $T_p$ is 1.42% in the case of the post having the radius r of 2.7 mm and 0.057% in the case of the post having the radius r of 10.8 mm. Thus, the transmitting power in the latter case is only about 1/25 of that in the former case. Due to the fact that the variation of the gap Δ corresponds to the corresponding variation of the gap between the oven door and the body of the high-frequency heating apparatus or the microwave oven in this case, employment of the post of larger size, that is, the hollow tubular metal element having a greater depth can realize an effective door seal arrangement capable of ensuring a reduced variation of leakage power against a variation of the gap. Although the frequency characteristic of the conductor post 241 disposed in the waveguide is not shown in FIG. 7, a frequency characteristic providing a wide rejection band width as shown by the solid curve in FIG. 6B is similarly obtained when the conductor post 241 has the larger radius r of 10.8 mm, while a frequency characteristic providing a narrow rejection band width as shown by the broken curve in FIG. 6B is obtained when the radius r of the conductor post 241 is smaller or 2.7 mm.

For the purpose of discussion of the behavior of an electromagnetic wave entering the channel 81 in the oven door of the high frequency heating apparatus, consider now the case in which the width of the top and bottom walls 23 in H-plane of the waveguide shown in FIG. 6A is sufficiently widened to provide a parallel plate transmission line. In such a case, leakage of an electromagnetic wave energy entering this line can be sufficiently prevented by periodically arranging a plurality of aforementioned hollow tubular metal elements in the parallel plate transmission line in a direction orthogonal with respect to the extending direction of the line, that is, when a wavy metal sheet 10 as shown in FIG. 5 is disposed between the flat surfaces of the parallel plate line.

FIG. 8A shows such a wavy metal sheet 10 disposed in a parallel plate transmission line 28. In FIG. 8A, the wavy metal sheet 10 has a period of undulation of 30 mm, a height 16 of 25 mm and a width 14 of 7.5 mm, and its crest 20 is spaced apart by 5 mm from one of the flat surfaces of the parallel plate transmission line 28. FIG. 8B shows the frequency characteristic of the structure shown in FIG. 8A when a plane wave enters the parallel plate transmission line 28 in the y-direction. It will be seen from the frequency characteristic shown in FIG. 8B that the rejection band width having the amount of attenuation over 30 dB covers the frequency range of about 400 MHz. This value is about two times that of the solid curve shown in FIG. 6B as will be readily apparent from comparison between FIG. 8B and FIG. 6B. The reasons for the exhibition of such a remarkable effect will now be discussed. The solid curve shown in FIG. 6B represents the frequency characteristic when only one hollow tubular metal element is inserted in the waveguide having the H-plane width of 90 mm. In the case of the frequency characteristic shown in FIG. 8B, the insertion of the wavy metal sheet 10 having the period of undulation of 30 mm in the waveguide corresponds to the insertion of three hollow tubular metal elements in the same waveguide having the H-plane width of 90 mm. It is therefore considered that the improved frequency characteristic shown in FIG. 8B can be obtained due to the fact that the number of the hollow tubular metal elements inserted in the waveguide is greater than in the case of FIG. 6B in which only one such element is inserted in the waveguide. FIG. 8C shows the relation between the incident angle and the amount of attenuation of a plane wave when such a wave is incident at an incident angle $\theta$ upon the structure shown in FIG. 8A. This incident angle $\theta$ denotes the angle between the incident direction of the plane wave and the y-direction of the waveguide. It can be understood from FIG. 8C that the larger the incident angle $\theta$, the wave cut-off effect of the wave metal sheet 10 becomes greater. The plane wave incident upon the wavy metal sheet 10 at the incident angle $\theta$ is expressed as the sum of the parallel incident component and the orthogonal incident component of the plane wave incident upon the wavy metal sheet 10, and it may be said that the wavy metal sheet 10 exhibits the wave cut-off effect for both these two components. The values plotted in FIGS. 8B and 8C are theoretical values calculated on the basis of the theoretical formula described in a paper entitled "High Performance Door Seal for Microwave Oven" by Shuji Ohkawa, Microwave Power Symposium 1978 Digest, pp. 2–4, IMPI, June 1978. The term "incident plane wave" used in the description related to FIGS. 8A to 8C denotes a plane wave having its electric field component only in the x-direction of the waveguide.

Therefore, by providing the wavy metal sheet 10 in the channel 81 of the oven door of the high-frequency heating apparatus in the manner shown in FIG. 4, the electromagnetic wave energy entering in parallel relation to the longitudinal direction of the channel 81 of the oven door as well as the electromagnetic wave energy entering in orthogonal relation to the longitudinal direction of the channel 81 is reflected back toward the heating chamber 7 of the high-frequency heating apparatus to be prevented from leakage toward the exterior.

The above description has only referred to the installation of the wavy metal sheet 10 in the longitudinal direction of the channel 81 in the oven door of the high-frequency heating apparatus. However, another point which will be described presently is also important for the full exhibition of the meritorious effects of the present invention. That is, the wavy metal sheet 10 must be disposed periodically and without any discontinuity in the channel 81 extending throughout the periphery of the oven door of the high-frequency heating apparatus so as to form a closed loop in the channel 81. This is because the absence of any one of the crests 20 (FIG. 5) of the wavy metal sheet 10, due to a discontinuity of the wavy metal sheet 10, results in the failure of formation of the aforementioned high-frequency electromagnetic shortcircuit plane at that position, and the electromagnetic wave passes freely through the discontinuous portion of the wavy metal sheet 10 to leak toward the exterior. It can be understood from the above discussion that the disposition of the wavy metal sheet 10 in the channel 81 in such a manner as to form a closed loop along the entire length of the channel 81 provided at the periphery of the oven door of the high-frequency heating apparatus can prevent the electromagnetic wave entered the channel 81 of the oven door from leaking toward the exterior.

It will be understood from the above description that the electromagnetic wave entering the channel 81 in the oven door is reflected back toward the heating chamber 7. In the event of occurrence of wave energy propagation in the longitudinal direction of the channel 81, the wavy metal sheet 10 in the door seal arrangement according to the present invention acts in a manner as described presently.

In FIG. 9 there is shown the wavy metal sheet 10 disposed in the channel 81 between the door front panel 1 and the oven flange 3 of the high-frequency heating apparatus. The coordinate system is now applied to the wavy metal sheet 10, and the longitudinal direction, the heightwise direction and the direction orthogonal with respect to the longitudinal direction of the wavy metal sheet 10 are designated by the z-direction, x-direction and y-direction respectively. When now a plane wave having an electric field component in the x-direction is incident upon the wavy metal sheet 10 in the z-direction in FIG. 9, the period of the electromagnetic wave propagating along the wavy metal sheet 10 of periodic undulating structure is n times the period of undulation of the structure, where n is an integer. (In FIG. 9, the period of the electromagnetic wave is shown to be two times the period of undulation of the wavy metal sheet 10.) Suppose that the period P of undulation of the wavy metal sheet 10 is two times the length of the horizontal or base portion 15 of the wavy metal sheet 10 in FIG. 5. When the electromagnetic wave propagates in such a relation that the phase difference between the adjacent crests 20 of the wavy metal sheet 10 is 180° as shown in (b) of FIG. 9, the wavelength $\lambda_z$ in the z-direction is given by $\lambda_z = 2P$. When, for example, P is selected to be $P = \lambda_o/4$ where $\lambda_o$ is the wavelength of light in the free space, the wavelength $\lambda_z$ in the z-direction is given by $\lambda_z = \lambda_0/2$, and the phase velocity $v_z$ in the z-direction is given by $v_z = C_o/2$ where $C_o$ is the velocity of light in the free space. Since the phase velocity of a plane wave propagating through an ordinary parallel plate transmission line is $C_o$, the phase velocity of the wave propagating in the z-direction is reduced to ½ of the velocity $C_o$ of light in the free space due to the provision of the periodic undulating structure which is the wavy metal sheet 10. Thus, a slow-wave circuit can be realized. As will be apparent from the theory of electromagnetic field, the relation $(2\pi/\lambda_o)^2 = \beta_x^2 + \beta_y^2 + \beta_z^2$ holds always in the free space, where $\beta_x$, $\beta_y$ and $\beta_z$ are the phase constants in x-, y- and z-direction respectively, and $\pi$ is the ratio of the circumference of a circle to its diameter. The phase constant $\beta_z$ in the z-direction, for example, is defined as $\beta_z = 2\pi/\lambda_z$. In the structure shown in FIG. 9, $\beta_x = 0$, and $(2\pi/\lambda_o)^2 = \beta_y^2 + (2\pi/\lambda_z)^2$, since the electric field component of the electromagnetic wave entering the channel 81 by way of the wave passage 19 (FIG. 4) of narrow width is considered to be uniformly distributed in the x-direction. On the other hand, the phase constant $\beta_y$ in the y-direction must be a pure imaginary number since $\lambda_o = 2\lambda_z$. That is, this phase constant $\beta_y$ is expressed as $\beta_y = -j\beta_y'$ where j is the imaginary unit, and $\beta_y'$ is a real number. Using this value of $\beta_y$ while neglecting the time-related term, the phase amplitude characteristic of the electromagnetic wave can be expressed as $$\exp\{-j\beta_y y\} = \exp\{-\beta_y' y\} = \exp\left\{-\frac{\sqrt{12\pi}}{\lambda_o} y\right\}.$$

This expression means that the electromagnetic wave is subjected to reactive attenuation and does not propagate in the y-direction, that is, although the wave energy is also stored in the y-direction, the density of that energy decreases according to an exponential function. For example, at a point spaced apart by $\lambda_o/4$ in the y-direction from the wavy metal sheet 10, the wave energy density at that point decreases by about 20 dB. Summarizing the above discussion, it can be concluded that, when a plane wave enters the circuit including the periodic undulating structure shown in FIG. 9 in the z-direction, the wave propagates in the z-direction at a velocity lower than that in the free space, and the wave does not propagate in the y-direction by being completely attenuated.

Preferred dimensions of the wavy metal sheet 10 in the door seal arrangement according to the present invention will be described with reference to FIG. 10. FIG. 10 shows the relation between the width 14 of the wavy metal sheet 10 and the density of maximum leakage power density (experimental values) leaking through the oven door of the high-frequency heating apparatus. It will be seen in FIG. 10 that the leakage power increases with the decrease in the width 14 of the wavy metal sheet 10. This is because a decrease in the width 14 of the wavy metal sheet 10 results in a corresponding reduction in the wave cut-off effect of the wavy metal sheet 10 against an incident electromagnetic wave as described already. It is needless to say that the wave cut-off effect is substantially lost in the case of a structure such as that provided by bending a wire. Therefore, the required width 14 of the wavy metal sheet 10 is more than at least $\lambda/30$. The data plotted in FIG. 10 represent those obtained when the width of the wave passage 19 in FIG. 4 is $\lambda/120$.

The distance 11 between the wavy metal sheet 10 and the outer peripheral wall 18 of the channel 81 in the oven door of the high-frequency heating apparatus in FIG. 4 will now be discussed. As described already, the installation of the wavy metal sheet 10 in the channel 81 of the oven door of the high-frequency heating apparatus can realize a slow-wave line extending in the longitudinal direction of the channel 81. However, the slow-wave effect is not unconditionally exhibited over the entire frequency range, but this slow-wave line is provided only for a specific frequency band. The line acts as an attenuating line for the remaining frequency range thereby preventing propagation of the electromagnetic wave in the longitudinal direction of the channel 81.

FIG. 11A shows a wavy metal sheet 10 disposed in a rectangular waveguide 21, and FIG. 11B shows the frequency characteristic of the structure shown in FIG. 11A. In FIG. 11A, the waveguide 21 has a width of 90 mm in the H-plane and a width of 30 mm in the E-plane, and the wavy metal sheet 10 has a height 16 of 27.5 mm, a width 14 of 7.5 mm and a period of undulation of 30 mm. It will be seen from FIG. 11B that a slow-wave circuit is realized at the frequency at which the rate of attenuation is 0 dB, and only in such a case, the electromagnetic wave propagating in the direction orthogonal with respect to the axis of the waveguide 21 is subjected to reactive attenuation. It will be understood from FIG. 11B that the distance l at 29 in FIG. 11A must be less than l=12 mm, that is, l must be less than at least $\lambda/10$ when the frequency of the electromagnetic wave used for high-frequency heating is, for example, 2,450 MHz.

With a decrease in the distance 17 between the wavy metal sheet 10 and the rear panel 2 of the oven door in FIG. 4, lines of electric force start to span therebetween. In such a case, the electromagnetic wave incident upon the wavy metal sheet 10 is no more a plane wave and has an electric field component in the direction orthogonal with respect to the direction of the height 16 of the wavy metal sheet 10, thereby reducing the wave cut-off effect of the wavy metal sheet 10. FIG. 12 shows the maximum leakage density of power leaking through the door portion of the high-frequency heating apparatus relative to the distance 17 between the wavy metal sheet 10 and the door rear panel 2 in FIG. 4. It can be understood from FIG. 12 that the required distance 17 between the wavy metal sheet 10 and the door rear panel 2 is more than at least $\lambda/12$. The experimental values plotted in FIG. 12 represent those obtained when the width of the wave passage 19 in FIG. 4 is $\lambda/60$.

In FIG. 4, the oven flange 3 and the door rear panel 2 define the wave passage 19 therebetween for the two purposes which will be described presently. Although the disposition of the wavy metal sheet 10 in the channel 81 is effective in preventing leakage of the electromagnetic wave of the frequency used for high-frequency heating, the wave passage 19 has a very narow width in the closed position of the oven door of the high-frequency heating apparatus, and therefore, the characteristic impedance of this parallel plate transmission line becomes high in such a state. It is the first purpose to utilize such a high impedance for enhancing the wave leakage preventive effect of the wavy metal sheet 10. As described already, a high-frequency electromagnetic short-circuit plane is formed at the position of the wavy metal sheet 10 in the door seal arrangement of the present invention, and therefore, the meritorious effects of the wavy metal sheet 10 are not in any way adversely affected by the state of metal-to-metal contact between the oven flange 3 and the rear panel 2 of the oven door defining the wave passage 19. A decrease in the length of the rear panel 2 will result in direct exposure of the cover member 9 to the heating chamber 7, and the cover member 9 may possibly be burnt by the heat generated during high-frequency heating. It is the second purpose for disposing the cover member 9 at a location sufficiently remote from the heating chamber 7.

Figure 13:
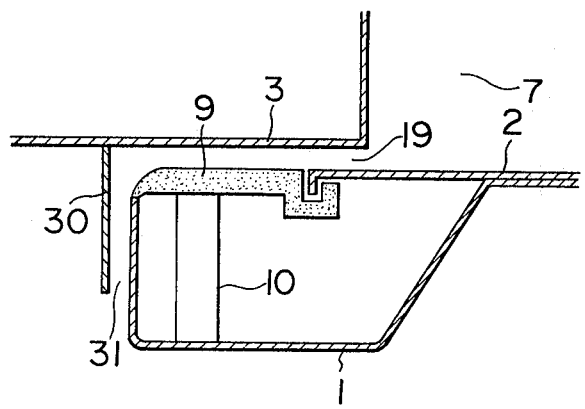
Figure 14:
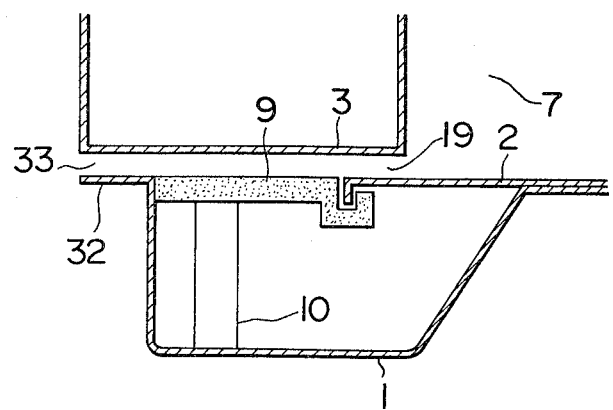

FIGS. 13 and 14 show modifications of the door seal arrangement shown in FIG. 4. In the modification shown in FIG. 13, a metal plate 30 extends at right angles from the oven flange 3 to define an additional wave passage 31 between it and the associated portion of the door front panel 1. In the modification shown in FIG. 14, a peripheral flange 32 is added to the door front panel 1 to provide an extension of the door front panel 1 thereby defining an additional wave passage 33 between it and the associated portion of the oven flange 3. Such an additional wave passage 31, 33 is provided for the reasons described presently. As described already, a high-frequency electromagnetical short-circuit plane is formed at the position of the wavy metal sheet 10, and the energy of the electric field and magnetic field stored at the location of the wavy metal sheet 10 is subjected to reactive attenuation. Thus, the energy density becomes lower at a point more remote from the wavy metal sheet 10. Further, as explained with reference to FIG. 9, propagation of the electromagnetic wave along the wavy metal sheet 10 will also store the energy which is subjected to reactive attenuation in the vicinity of the wavy metal sheet 10.

The additional provision of the wave passage 31 or 33 in FIG. 13 or 14 aims at lowering the leakage power level. For example, the additional provision of the wave passage 31 having a length of $\lambda/6$ as shown in FIG. 13 could experimentally lower the leakage power level by about 7 dB.

The aforementioned embodiments of the door seal arrangement have been realized by disposing the wavy metal sheet 10 in the channel 81 of the oven door of the high-frequency heating apparatus. However, another effective door seal arrangement can also be realized when the channel is formed in the oven flange 3 instead of the oven door, and the wavy metal sheet 10 is disposed in that channel, inasmuch as the wavy metal sheet 10 exhibits the wave cut-off effect when it is disposed in a parallel plate transmission line. According to this method, the oven door thickness can be decreased as will be readily apparent from embodiments which will be described now.

Figure 15:
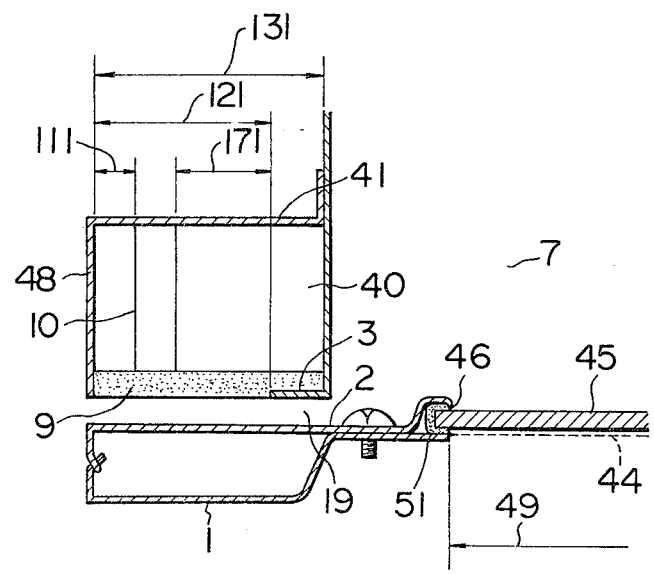

Another embodiment of the door seal arrangement according to the present invention is shown in FIG. 15 which is a schematic sectional view of principal parts located in the vicinity of an oven flange 3. A channel 40 is formed in the oven flange 3 defining the wall of a heating chamber 7, and the width 121 of the opening of the channel 40 is selected to be smaller than the width 131 of the wall portion of the heating chamber 7 opposite to the oven door, so that a wave passage 19 in the form of a parallel plate transmission line is formed between that portion of the oven flange 3 and the associated portion of a rear panel 2 of the oven door. A wavy metal sheet 10 having a shape as shown in FIG. 5 is disposed in the channel 40 formed in the oven flange 3. The opening of the channel 40 is covered with a cover member 9 of a plastic material which prevents intrusion of foul material and protects the internal structure of the channel 40. In FIG. 15, the reference numerals 1, 111 and 171 designate a door front panel, the distance between the wavy metal sheet 10 and the outer peripheral wall 48 of the channel 40, and the distance between the wavy metal sheet 10 and the end of the opening of the channel 40 nearer to the heating chamber 7, respectively. Further, the reference numerals 41, 44, 45, 46, 49 and 51 designate the wall portion defining the bottom face of the channel 40, a metal plate having a central perforated or punched portion for permitting viewing of the interior of the heating chamber 7, a transparent glass plate, a curved edge portion of the door rear panel 2, an effective viewing area, and a sealing material, respectively.

The preferred dimensions described with reference to the embodiment shown in FIG. 4 are directly applicable to the embodiment shown in FIG. 15: (1) The width 14 of the wavy metal sheet 10 should be more than at least $\lambda/30$; (2) the distance 111 between the wavy metal sheet 10 and the outer peripheral wall 48 of the channel 40 should be less than at least $\lambda/10$; and (3) the distance 171 between the wavy metal sheet 10 and the end of the opening of the channel 40 nearer to the heating chamber 7 should be more than at least $\lambda/12$.

Figure 16:
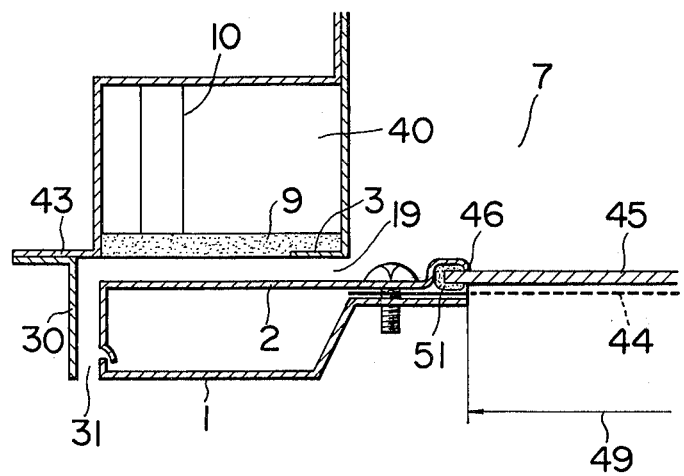
Figure 17:
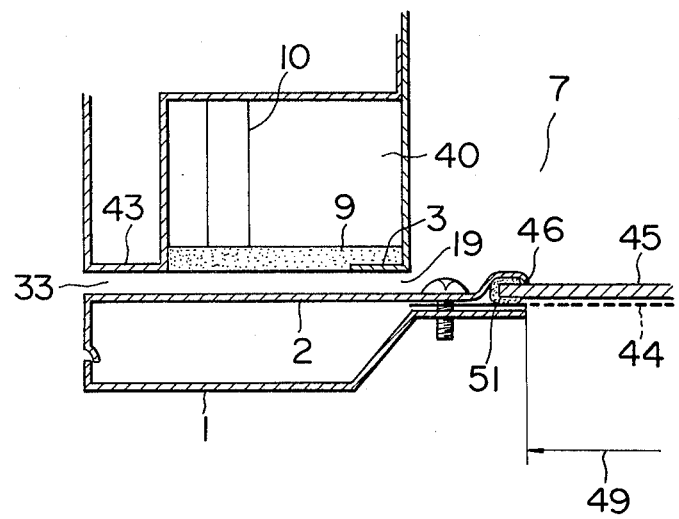

FIGS. 16, 17, 18 and 19 show modifications of the embodiment shown in FIG. 15. In the modification shown in FIG. 16, a metal plate 30 extends at right angles from an extension 43 of the wall of the heating chamber 7 to define a wave passage 31 between it and the associated portion of the door rear panel 2, in addition to the wave passage 19. Although the separately prepared metal plate 30 is added to the wall extension 43 of the heating chamber 7, this extension 43 may be bent at right angles to replace the metal plate 30 partly surrounding the oven door, thereby eliminating the addition of the separately prepared metal plate 30. In the modification shown in FIG. 17, an extension 43 of the wall of the heating chamber 7 extending in parallel to the door rear panel 2 defines a wave passage 33 between it and the associated portion of the door rear panel 2, in addition to the wave passage 19. The wave passage 31 or 33 in FIG. 16 or 17 is additionally provided for the same reasons as those described already.

In the modification shown in FIG. 18, the viewing plate 44 of metal is extended together with a back-up plate 50 of a plastic material to define the wave passage 19 between its extension and the associated portion of the oven flange 3 of the high-frequency heating apparatus. The door seal arrangement shown in FIG. 18 is improved over those shown in FIGS. 15, 16 and 17 in the utility of the high-frequency heating apparatus in that the area of the central punched portion 47 of the viewing plate 44 for viewing the interior of the heating chamber 7 of the high-frequency heating apparatus can be further widened. In the structure shown in FIG. 18, the effective viewing area 49 of the viewing metal plate 44 can be widened to be equal to the entire area of the opening of the heating chamber 7, whereas, in the structures shown in FIGS. 15, 16 and 17, the effective viewing area 49 is limited or determined by the curved edge portion 46 of the door rear panel 2.

The modification shown in FIG. 19 is also constructed so that the effective viewing area 49 is equal to the entire area of the opening of the heating chamber 7 of the high-frequency heating apparatus. In the door seal arrangement shown in FIG. 19, the glass plate 45 and the viewing metal plate 44 are sandwiched at their end edges between the front panel 1 and the rear panel 2 of the oven door, and a molded front plate 60 of a plastic material is fixed by screws to cover the entire front area of the oven door in order to fill up the concavity and convexity of the associated members. The cover member 9 is formed with a recess to receive the heads of the setting screws therein.

The prior art door seal arrangement for the high-frequency heating apparatus is comprised of the combination of the choke system, the metal-to-metal contact and the wave absorbing material to prevent undesirable wave leakage. In contrast, the door seal arrangement according to the present invention comprising the improved means for preventing undesirable wave leakage has been capable of attaining the door seal performance better than heretofore without the use of the wave absorbing material. Consequently, it has been possible to improve the heat resistivity of the door seal due to the elimination of the wave absorbing material such as carbon rubber or ferrite rubber which has a low resistance against heat. It has also been possible to reduce the overall cost of the high-frequency heating apparatus by the amount corresponding to the cost of the wave absorbing material.

The improved door seal performance of the door seal arrangement according to the present invention will be quantitatively explained with reference to FIG. 20. FIG. 20 shows the dimensions of the principal parts of the oven door and shows also the maximum leakage power density relative to the gap $a_1$ when the door seal arrangement according to the present invention is designed to be suitable for mass production. The microwave oven had a power output of 500 watts with a center microwave frequency of 2,450 MHz and was used to heat a standard load of 275 ml of water. As described previously, it is one of the objects of the present invention to provide an improved door seal arrangement for a high-frequency heating apparatus, so that an increase in the gap 54 between the oven flange 3 and the rear panel 2 of the oven door may not give rise to a sharp increase in the leakage power. In a practical high-frequency heating apparatus such as that shown in FIG. 3, the oven door is connected at its lower part to the body of the high-frequency heating apparatus by a hinge connection 53. Therefore, the lower gap 54 between the oven flange 3 and the lower part of the rear panel 2 will be only about 1 mm even when the assembly error is taken into account. However, the upper gap 54 between the oven flange 3 and the upper part of the door rear panel 2 will amount to several mm in the door open-close direction.

Two curves are shown in FIG. 20 to represent the maximum leakage power density (mW/cm$^2$) when the upper gap 54 between the oven flange 3 and the upper part of the door rear panel 2 is increased while fixing the lower gap 54 between the oven flange 3 and the lower part of the door rear panel 2 at a value of 1 mm. In FIG. 20, the horizontal axis represents the upper gap $a_1$ (mm) between the oven flange 3 and the upper part of the door rear panel 2. The solid curve represents the maximum leakage power density relative to the gap $a_1$ in the door seal arrangement according to the present invention, and it will be seen in FIG. 20 that the maximum leakage power density relative to the gap $a_1$ of, for example, 5 mm is only about 0.06 mW/cm$^2$. It will be readily understood that this solid curve has a moderate inclination. The broken curve in FIG. 20 represents the same relation in the case of the prior art door seal arrangement comprised of the combination of the choke system, the metal-to-metal contact and the wave absorbing material. It will be seen that the broken curve has a very steep inclination, and the maximum leakage power density at the value of the gap $a_1$ of 2 mm is about 1 mW/cm$^2$ in the case of the prior art, whereas it is only about 0.045 mW/cm$^2$ in the case of the present invention. Thus, there is a marked difference between these two curves. In other words, the door seal performance of the door seal arrangement according to the present invention, which eliminates the use of the wave absorbing material, can be improved by about 27 dB compared with that of the prior art door seal arrangement. Therefore, the present invention can improve the safety by the degree corresponding to the value of 27 dB, and at the same time, can reduce the overall cost of the high-frequency heating apparatus by eliminating the latching mechanism which has been employed in the prior art door seal arrangement for maintaining the gap between the oven flange and the part of the door rear panel as small as possible during high-frequency heating by the high-frequency heating apparatus.

What we claim is:

1. In a high-frequency heating apparatus comprising a heating chamber having an access opening and a door for opening and closing said access opening, a door seal arrangement for preventing leakage of electromagnetic wave energy through a peripheral area of said door, the door and the heating chamber forming a parallel plate transmission line, a plurality of reactance elements of a conductive metal material disposed in the parallel plate transmission line so as to extend along the peripheral area of said access opening thereby forming a series resonance circuit connected in parallel with said parallel plate transmission line, and said series resonance circuit providing a high-frequency electromagnetic short-circuit plane at the disposed location of said reactance elements, whereby the electromagnetic wave energy emerging from within said heating chamber to be incident at an arbitrary incident angle upon said parallel plate transmission line and tending to leap toward an exterior of the high-frequency heating apparatus can be reflected back toward said heating chamber.

2. A door seal arrangement as claimed in claim 1, wherein each of said reactance elements has a circular cross section.

3. A door seal arrangement as claimed in claim 1, wherein each of said reactance elements has a rectangular cross section.

4. A door seal arrangement as claimed in claim 1, wherein each of said reactance elements has a flat oval cross section.

5. A door seal arrangement as claimed in one of claims 2, 3 or 4, wherein each of said reactance elements is a post of a conductive metal material.

6. A door seal arrangement as claimed in one of claims 2, 3 or 4, wherein each of said reactance elements is a pipe of a conductive metal material.

7. A door seal arrangement as claimed in claim 1, wherein each of said reactance elements is a tubular element of a conductive metal material having its central axis extending substantially in parallel with said parallel plate transmission line.

8. A door seal arrangement as claimed in claim 1, wherein said reactance elements are in the form of a sheet of a conductive metal material bent into a wavy shape.

9. A door seal arrangement as claimed in claim 1, wherein said reactance elements are substantially periodically disposed along said access opening of said heating chamber to extend therealong without any substantial discontinuity.

10. A door seal arrangement as claimed in claim 9, wherein a period of the periodic disposition of said reactance elements is less than at least about $\lambda/2$, where $\lambda$ is the wavelength of the electromagnetic wave used for high-frequency heating.

11. In a high-frequency heating apparatus comprising a heating chamber having an access opening and a door for opening and closing said access opening, a door seal arrangement for preventing leakage of electromagnetic wave energy through the peripheral area of said door, said door seal arrangement comprising a channel means formed in said door at an area opposite to a confronting wall portion of said heating chamber and having an opening defined by portions of front and rear panels of said door, and a waving metal sheet disposed in said channel means so as to extend in the longitudinal direction of said channel means, said waving metal sheet having a width of more than at least about $\lambda/30$ and a length of its base portion less than at least about $\lambda/2$, where $\lambda$ is the wavelength of the electromagnetic wave used for high-frequency heating.

12. A door seal arrangement as claimed in claim 11, wherein said channel means extends along an entire peripheral area of said door, and said wavy metal sheet extends along an entire length of said channel means to form a closed loop in said channel means.

13. A door seal arrangement as claimed in claim 11, wherein the opening of said channel means has a width smaller than a width of the confronting wall portion of said heating chamber, and said door seal arrangement includes at least one of a first wave passage and a second wave passage, said first wave passage being in the form of the parallel plate transmission line constituted by a portion of the wall of said heating chamber and an associated portion of the rear panel of the door defining an inner periphery of the opening of said channel means, and said second wave passage being in the form of the parallel plate transmission line constituted by an extension of the wall portion of said heating chamber and an associated portion of the front panel of the door.

14. A door seal arrangement as claimed in claim 13, wherein a flange extends from the entire periphery of said door front panel in parallel relation with the wall portion of said heating chamber, and said second wave passage is defined between said flange and said extension of the wall portion of said heating chamber.

15. A door seal arrangement as claimed in claim 13, wherein said extension of the wall portion of said heating chamber is provided by a metal plate extending substantially at right angles from the wall portion of said heating chamber toward said door to partly surround said door, and said second wave passage is defined between said metal plate and the associated portion of said door front panel.

16. A door seal arrangement as claimed in claim 11, wherein a distance between said wavy metal sheet and a portion of said rear panel of the door defining an inner periphery of the opening of said channel means is selected to be larger than a distance between said metal sheet and an outer peripheral wall of said front panel of the door defining an outer end of said channel means.

17. A door seal arrangement as claimed in claim 16, wherein the distance between said wavy metal sheet and the outer peripheral wall of said front panel of the door defining the outer end of said channel means is selected to be less than at least about $\lambda/10$, where $\lambda$ is the wavelength of the electromagnetic wave used for high-frequency heating.

18. A door seal arrangement as claimed in claim 16, wherein the distance between said wavy metal sheet and the portion of said rear panel of the door defining the inner periphery of the opening of said channel means is selected to be more than at least about $\lambda/12$, where $\lambda$ is the wavelength of the electromagnetic wave used for high-frequency heating.

19. In a high-frequency heating apparatus comprising a heating chamber having an access opening and a door for opening and closing said access opening, a door seal arrangement for preventing leakage of electromagnetic wave energy through a peripheral area of said door, said door seal arrangement comprising a channel means formed in a flange of a wall of said heating chamber at an area opposite to said door and having an opening directed toward said door, and a wavy metal sheet disposed in said channel means to extend in a longitudinal direction of said channel means, said wavy metal sheet having a width of more than at least about $\lambda/30$ and a length of a base portion thereof which is less than at least about $\lambda/2$, where $\lambda$ is the wave length of the electromagnetic wave used for high-frequency heating.

20. A door seal arrangement as claimed in claim 19, wherein said channel means extends along an entire peripheral area of said oven flange, and said wavy metal sheet extends along an entire length of said channel means to form a closed loop in said channel means.

21. A door seal arrangement as claimed in claim 19, wherein the opening of said channel means has a width which is smaller than a width of the wall portion of said heating chamber opposite to said door, and said door seal arrangement includes at least one of a first wave passage and a second wave passage, said first wave passage being in the form of the parallel plate transmission line constituted by a portion of a rear panel of the door and an associated wall portion of said heating chamber defining the opening of said channel means extending in parallel with said portion of the rear panel of the door, and said second wave passage being in the form of the parallel plate transmission line constituted by another portion of the rear panel of the door and an extension of the wall portion of said heating chamber.

22. A door seal arrangement as claimed in claim 21, wherein said extension of the wall portion of said heating chamber is provided by a metal plate extending in an extending direction of said portion of the rear panel of the door disposed opposite to the wall portion of said heating chamber, and said second wave passage is defined between said extension of the wall portion of said heating chamber and the associated portion of the rear panel of the door.

23. A door seal arrangement as claimed in claim 21, wherein said extension of the wall portion of said heating chamber is provided by a metal plate extending substantially at right angles from the wall portion of said heating chamber toward said door to partly surround said door, and said second wave passage is defined between said metal plate and the associated portion of the rear panel of the door.

24. A door seal arrangement as claimed in one of claims 21, 22 or 23, wherein the rear panel includes a viewing plate of a metal material locally punched to permit viewing of the interior of said heating chamber.

25. A door seal arrangement as claimed in claim 19, wherein a distance between said wavy metal sheet and an inner-periphery of the opening of said channel means nearer to said heating chamber is selected to be larger than a distance between said wavy metal sheet and an outer peripheral wall of said heating chamber defining the outer end of said channel means.

26. A door seal arrangement as claimed in claim 25, wherein a distance between said wavy metal sheet and the outer peripheral wall of said heating chamber defining the outer end of said channel means is so as to be less than at least about $\lambda/10$, where $\lambda$ is the wavelength of the electromagnetic wave used for high-frequency heating.

27. A door seal arrangement as claimed in claim 25, wherein a distance between said wavy metal sheet and the inner periphery of the opening of said channel means nearer to said heating chamber is selected so as to be more than at least about $\lambda/12$, where $\lambda$ is the wavelength of the electromagnetic wave used for high-frequency heating.

28. In a high-frequency heating apparatus comprising a heating chamber having an access opening and a door for opening and closing said access opening, a door seal arrangement for preventing leakage of electromagnetic wave energy through a peripheral area of said door, said door and said heating chamber forming a parallel plate transmission line, a plurality of reactance elements of a dielectric material having a high-dielectric constant disposed in the parallel plate transmission line so as to extend along the peripheral area of said access opening thereby forming a series resonance circuit connected in parallel with said parallel plate transmission line, and said series resonance circuit providing a high-frequency electromagnetic short-circuit plane at the disposed location of said reactance elements, whereby the electromagnetic wave energy emerging from within said heating chamber to be incident at an arbitrary incident angle upon said parallel plate transmission line and tending to leak toward the exterior of the high-frequency heating apparatus can be reflected back toward said heating chamber.

29. A door seal arrangement as claimed in claim 28, wherein each of said reactance elements has a circular cross section.

30. A door seal arrangement as claimed in claim 28, wherein each of said reactance elements has a rectangular cross section.

31. A door seal arrangement as claimed in claim 28, wherein each of said reactance elements has a flat oval cross section.

32. A door seal arrangement as claimed in claim 28, wherein said reactance elements are substantially periodically disposed along said access opening of said heating chamber to extend therealong without any substantial discontinuity.

33. A door seal arrangement as claimed in claim 32, wherein the period of the periodic disposition of said reactance elements is less than at least about $\lambda/2$, where $\lambda$ is the wave length of the electromagnetic wave used for high-frequency heating.

* * * * *